(12) United States Patent
Deseyve et al.

(10) Patent No.: US 11,358,530 B2
(45) Date of Patent: Jun. 14, 2022

(54) APPARATUS FOR RECEIVING AN OBJECT IN A MOTOR VEHICLE

(71) Applicant: AUDI AG, Ingolstadt (DE)

(72) Inventors: Eric Deseyve, Hitzhofen (DE);
Matthias Zacherl, Dietfurt (DE);
Ahmed Moussa, Ingolstadt (DE);
Sidney Groß, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 305 days.

(21) Appl. No.: 16/629,114

(22) PCT Filed: Jul. 12, 2018

(86) PCT No.: PCT/EP2018/068866
§ 371 (c)(1),
(2) Date: Jan. 7, 2020

(87) PCT Pub. No.: WO2019/020386
PCT Pub. Date: Jan. 31, 2019

(65) Prior Publication Data
US 2020/0130588 A1    Apr. 30, 2020

(30) Foreign Application Priority Data

Jul. 26, 2017 (DE) ..................... 10 2017 007 060.1

(51) Int. Cl.
*B60R 7/02* (2006.01)
*B60R 11/06* (2006.01)
(Continued)

(52) U.S. Cl.
CPC ................ *B60R 7/02* (2013.01); *B60R 11/06* (2013.01); *B60R 13/013* (2013.01);
(Continued)

(58) Field of Classification Search
CPC ......... B60R 7/02; B60R 11/06; B60R 13/013; B60R 2011/0071; B60R 2011/0075; B60R 2013/016; B60R 11/00; B60R 13/011
(Continued)

(56) References Cited

U.S. PATENT DOCUMENTS 4,875,028 A * 10/1989 Chou ...................... B60Q 7/00
340/473
5,580,153 A * 12/1996 Motz ...................... B60Q 1/302
362/496
(Continued)

FOREIGN PATENT DOCUMENTS

DE    102006020953 A1    1/2008
DE    102014207362 A1    10/2015
(Continued)

OTHER PUBLICATIONS

German Office Action dated Apr. 23, 2021, in connection with corresponding DE Application No. 10 2017 007 060.1 (10 pp., including machine-generated English translation).
(Continued)

*Primary Examiner* — Pinel E Romain
(74) *Attorney, Agent, or Firm* — Maier & Maier, PLLC

(57) ABSTRACT

An apparatus for receiving a cuboidal object, which has three side edges of different length, in a motor vehicle, having a receiving space, which has an insertion opening, the length of which corresponds at least to the length of the longest side edge of the object and whose width corresponds at least to the length of the shortest side edge of the object, but at least in sections is smaller than the length of the side edge of the object with the medium length, wherein the receiving space is of such a size that the object after being inserted through the insertion opening in the receiving space can be rotated through an angle of at least approximately 90° about its longitudinal axis and can be moved to a storage position in the receiving space.

20 Claims, 3 Drawing Sheets

(51) Int. Cl.
  *B60R 13/01* (2006.01)
  *B60R 11/00* (2006.01)
(52) U.S. Cl.
  CPC ............. *B60R 2011/0071* (2013.01); *B60R 2011/0075* (2013.01); *B60R 2013/016* (2013.01)
(58) Field of Classification Search
  USPC ........................................ 296/37.1
  See application file for complete search history.

(56) References Cited

U.S. PATENT DOCUMENTS

| | | | |
|---|---|---|---|
| 8,833,988 B2* | 9/2014 | Larsson | B60Q 7/00 362/496 |
| 10,703,182 B2* | 7/2020 | Causemann | B60R 5/044 |
| 2009/0026959 A1* | 1/2009 | Lin | B60Q 3/217 315/77 |
| 2016/0214540 A1 | 7/2016 | Parlow et al. | |

FOREIGN PATENT DOCUMENTS

| | | |
|---|---|---|
| DE | 10 2016 225 658 A1 | 6/2018 |
| WO | 2018114146 A1 | 6/2018 |

OTHER PUBLICATIONS

English-language translation of International Preliminary Report on Patentability dated Feb. 6, 2020, in corresponding International Application No. PCT/EP2018/068866; 9 pages.
International Search Report dated Oct. 22, 2018 and Written Opinion in corresponding International Application No. PCT/EP2018/068866; 17 pages; Machine translation attached.

* cited by examiner

APPARATUS FOR RECEIVING AN OBJECT IN A MOTOR VEHICLE

FIELD

The disclosure relates to an apparatus for receiving an object in a motor vehicle.

BACKGROUND

From DE 10 2006 020 953 B4 there is known an apparatus for receiving an object used in a motor vehicle. This apparatus comprises a receiving space, which can be closed by means of a cover, for receiving and holding the object securely. However, the cover and the locking elements mounted thereon cause increased material costs and increased assembly labor. A further drawback of this solution is that the object is not immediately recognizable by the user when the cover is closed. However, this is a problem, for example in the case of a warning triangle arranged in the lining of a trunk hood, since a warning triangle should be immediately recognizable in order not to cause any delay in an emergency.

DE 10 2014 207 362 A1 describes a similar apparatus, in which the object is held in its position by means of spring elements arranged on the long sides of a recess. The drawback of this known apparatus, however, is the cumbersome mounting of the object in the recess, since this needs to be inserted into the recess against the force of two spring elements working against each other.

Therefore, the problem which the present invention proposes to solve is to create an apparatus for holding an object in a motor vehicle that can be produced with little expense and that requires little effort in the mounting and especially the dismounting or removal of the object.

SUMMARY

Thanks to the design of the receiving space and its insertion opening in relation to the size and shape of the object to be received according to the invention, it is possible to insert the object by the more flat side through the insertion opening into the receiving space, to rotate it about an angle of around 90°, and to secure the object thanks to the design of the insertion opening according to the invention, having at least in sections a lesser width than the length of the side edge with the medium length, so that the object is securely held in the receiving space even in event of a crash. Advantageously, the cuboidal shape of the object is utilized and the receiving space is designed accordingly.

The solution according to the invention is distinguished by a lesser number of components, which significantly reduces its costs as compared to known solutions, as this results in not only lower material costs, but also lower installation expense. A further benefit of the solution according to the invention is that no additional tools are needed for the mounting and dismounting. Furthermore, the elimination of a cover ensures a better visibility and good accessibility, which may bring major benefits in a serious situation.

In one very advantageous modification of the invention, it may be provided that the depth of the receiving space corresponds at least to the length of the side edge of the object having the medium length, and the height of the receiving space corresponds at least to the length of the side edge of the object having the medium length. In this way, the object can be rotated in very easy manner in the receiving space and be placed in its storage position.

Another advantageous embodiment of the invention may consist in that the object is held in the receiving space with form fit and force locking. The combination of a form-fitted and a force-locked accommodation of the object in the receiving space enables an easy mounting in and in particular a removal of the object from the receiving space and moreover ensues that the object is held securely in the receiving space.

In another advantageous embodiment of the invention it may be provided that the receiving space comprises a recess, whose extension in the direction of the depth of the receiving space corresponds at least approximately to the length of the shortest side edge of the object. Thanks to the recess, a further reaching around the object in the receiving space is achieved, which improves the firm supporting of the object in the receiving space. Moreover, this enables a simple design for the form fitted accommodation of the object in the receiving space.

Further advantageous embodiments and modifications of the invention will emerge from the rest of the dependent claims. In the following, an exemplary embodiment of the invention is represented in principle with the aid of the drawing.

BRIEF DESCRIPTION OF THE DRAWING

There are shown.

DETAILED DESCRIPTION

Figure 1:
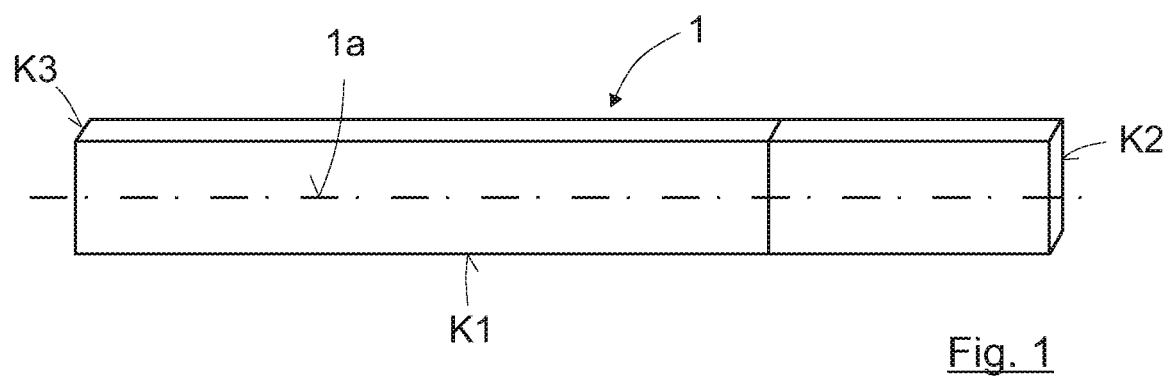
FIG. 1 an object which is to be received by means of the apparatus according to the invention.
Figure 2:
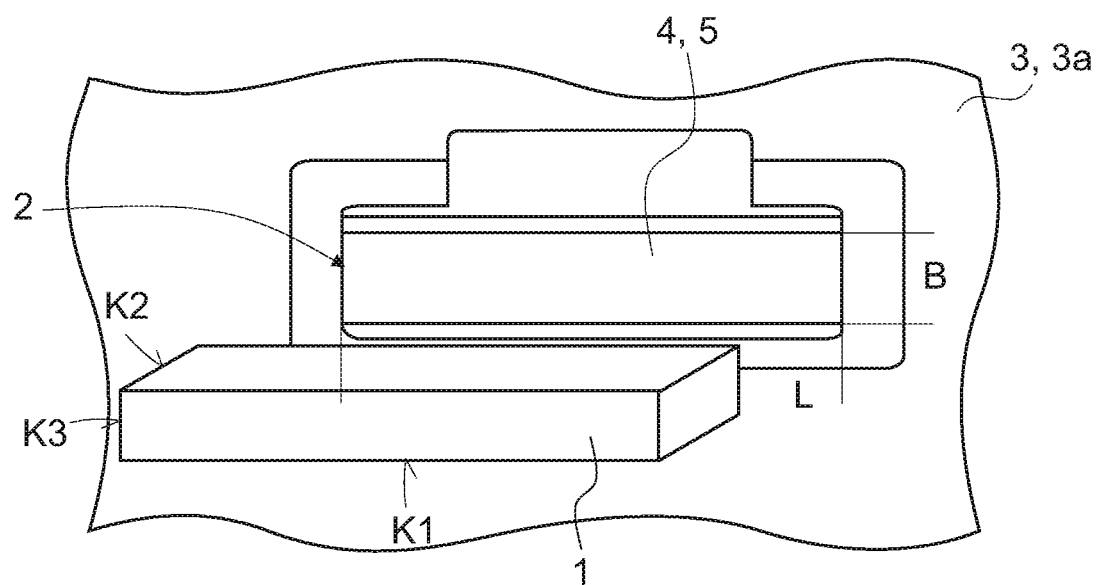
FIG. 2 a perspective representation of an apparatus according to the invention in a first step of introducing the object in the receiving space of the apparatus.

FIG. 1 shows an object 1, which can be accommodated by means of a following described apparatus 2 in a motor vehicle not represented. The object 1 in the present case is a package of a warning triangle, not shown, which is to be received in a lining 3 of a trunk hood of the motor vehicle, represented in FIGS. 2 to 7.

The object 1 has a cuboidal shape with three side edges K1, K2 and K3 of different length. The side edge K1 here has the greatest length, the side edge K2 has medium length, and the side edge K3 has the smallest length. In other words, the side edge K1 is the longest side edge and the side edge K3 is the shortest side edge of the object 1. The length of the side edge K2 is between the lengths of the side edges K1 and K3. In the present instance, the length of the longest side edge K1 is significantly longer than the two lengths of the side edges K2 and K3.

In order to receive the object 1, the lining 3 comprises a receiving space 4, which is bounded by several walls 3a of the lining 3. FIGS. 2, 3, 4 and 5 show the receiving space 4 serving to receive the object 1 in various views. The receiving space 4 has an insertion opening 5, through which the object 1 can be introduced into the receiving space 4 according to arrow A in FIG. 3. The length L of the insertion opening 5 corresponds at least to the length of the longest side edge K1 of the object 1. The width B of the insertion opening 5 corresponds at least to the length of the shortest side edge K3 of the object 1, but it is at least in sections less than the length of the side edge K2 with the medium length. In this way, the object 1 can only be introduced by its shortest side edge K3 into the insertion opening 5. On the other hand, it is of course also only possible to take the object 1 out from the receiving space 4 by its shortest side edge K3 through the insertion opening 5.

Furthermore, the receiving space 4 is of such size that the object after being introduced through the insertion opening 5 into the receiving space 4 can be rotated by an angle of at least approximately 90° about its longitudinal axis 1a and can be placed in a storage position in the receiving space 4. The depth T of the receiving space 4 corresponds at least to the length of the side edge K2 with the medium length. The height H of the receiving space 4 corresponds at least to the length of the side edge K2 with the medium length. In this way, the object 1 is able to turn about its longitudinal axis 1a.

By the phrase "at least" is meant in the present case that the corresponding dimensions of the receiving space 4 may also be larger. But since only a little room is usually present in a motor vehicle, one will only select dimensions of the receiving space 4 slightly larger than the mentioned dimensions of the side edges K1, K2 and K3 of the object 1.

Figure 3:
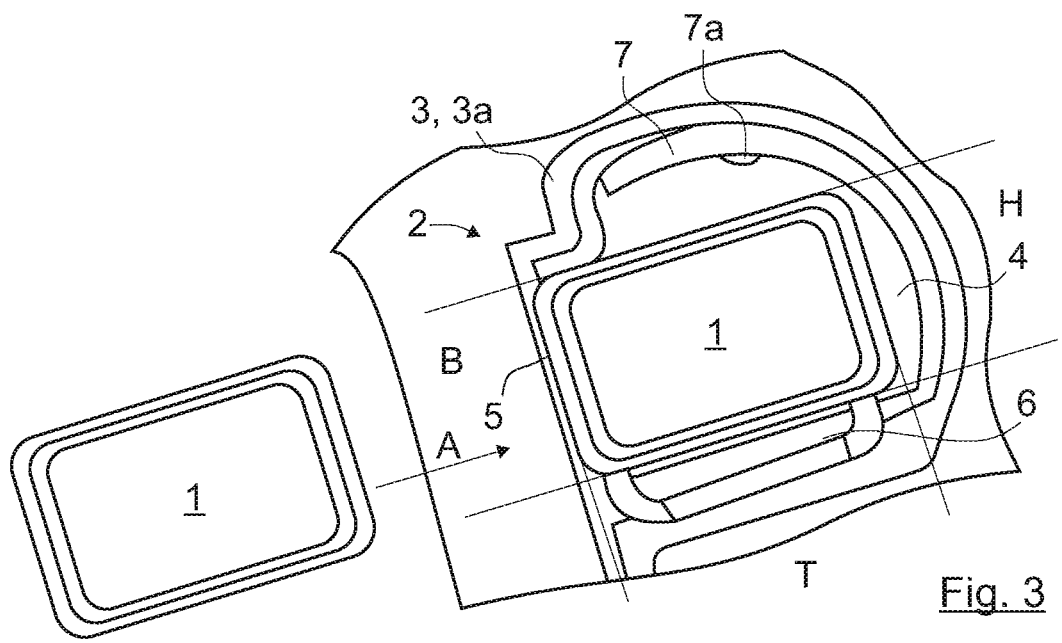
FIG. 3 the apparatus of FIG. 2 in a second step.
Figure 4:
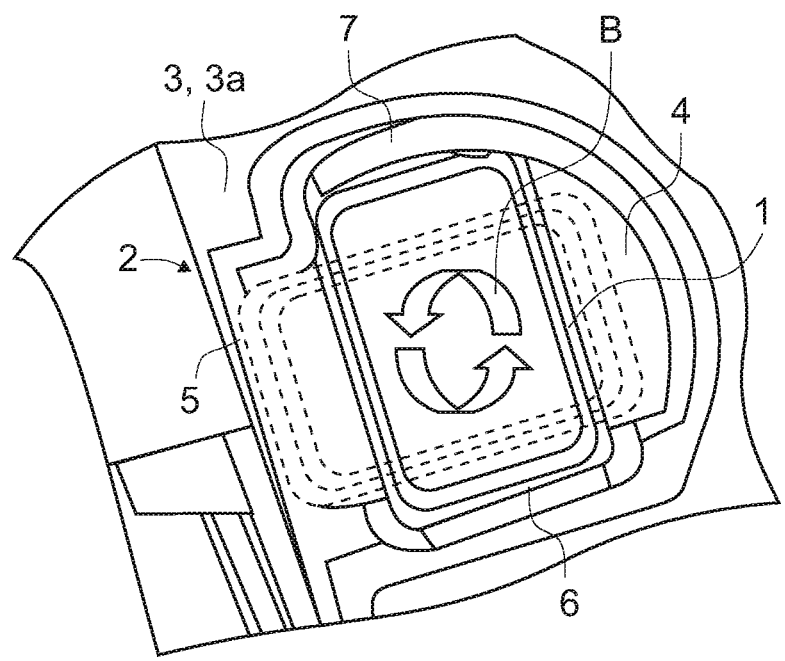
FIG. 4 the apparatus of FIG. 2 and FIG. 3 in a third step.
Figure 5:
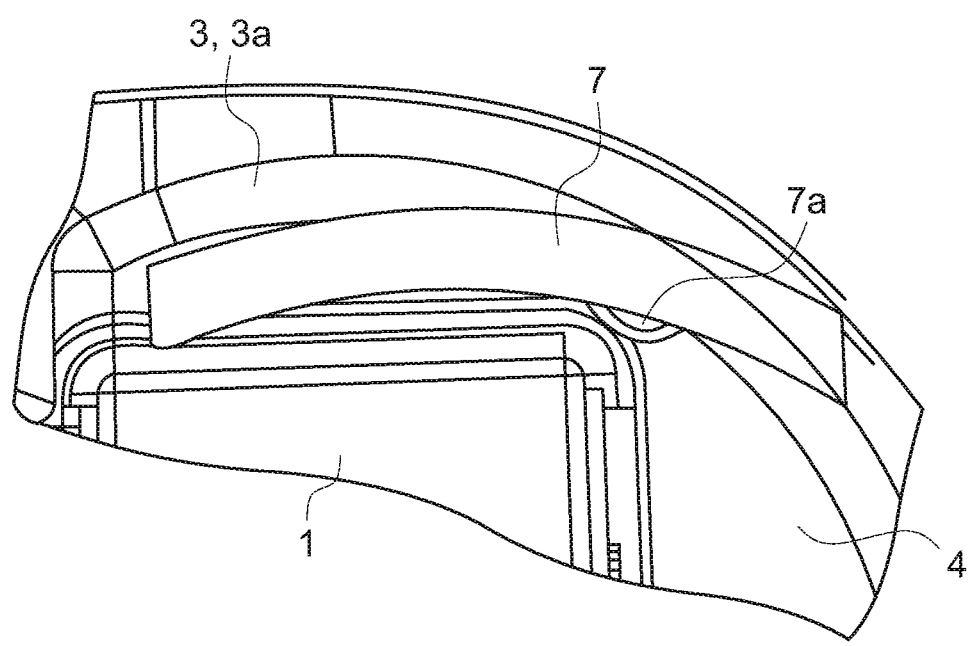
FIG. 5 an enlarged representation along line V of FIG. 4.

While FIG. 3 shows the introducing of the object 1 through the insertion opening 5 into the receiving space 4, FIG. 4 shows the storage position of the object 1 in the receiving space 4, rotated by 90°. The position of the object 1 after being introduced according to arrow A of FIG. 3 is shown by broken lines in FIG. 4. The rotation of the object 1 in the representation of FIGS. 3 and 4 is counterclockwise along the arrow B. Of course, a clockwise rotation will occur when the object 1 is viewed from the opposite side. Since the removal of the object 1 from the receiving space 4 occurs in reverse order to the introducing thereof into the space, the representation of FIG. 3 also corresponds to such a removal.

In FIG. 4 it can be seen that the object 1 because of the fact that it is taller in the 90° rotated storage position than the width B of the insertion opening 5 cannot be removed outright from the receiving space 4. This prevents a losing of the object 1. Instead, for the removal of the object 1 from the receiving space 4 a 90° rotation along the arrow B is required, in order to remove it by its shortest side edge K3 through the insertion opening 5.

FIG. 4 furthermore shows that the receiving space 4 has a recess 6 whose extension in the direction of the depth T of the receiving space 4 corresponds at least approximately to the length of the shortest side edge K3 of the object 1. This produces a form fitted accommodation of the lower area of the object 1 in the receiving space 4. Furthermore, the recess 6 accomplishes an additional positional fixation of the object 1 in the receiving space 4 and prevents it from slipping out.

Furthermore, a spring element 7 is provided in the receiving space 4 on the side opposite the recess 6, in the present instance the top side of the receiving space 4, protruding into the receiving space 4. The spring element 7 produces a force-locking support for the object 1 in the receiving space 4. The spring element 7 in the embodiment shown is made as a single piece with a wall 3a of the lining 3 forming the receiving space 4. During the above described rotating of the object 1, the object is pressed against the spring element 6. The spring element 6 in this way generates an opposing force on the object 1 in the storage position and thus holds it in the storage position. Thus, the object 1 is clamped by the spring element 7 in the receiving space 4, so that a flapping or other noise production is prevented.

The combination of the recess 6 on the one hand and the spring element 7 on the other hand therefore produces a combined supporting of the object 1 in the receiving space 4 by means of form fit and force locking.

The spring element 7, there being preferably provided at least two such elements over the length of the receiving space 4, is preferably arranged such that in the closed state of the rear gate it is located above the object 1, in order not to be loaded constantly by the weight thereof.

Alternatively to the spring element 7, it would also be possible to utilize the flexibility of the plastic material used for the wall 3a of the lining 3 in order to achieve a securing of the object 1 in the receiving space 4. Optionally, a different, preferably softer material could also be used in this area.

Furthermore, the spring element 7 in the present case comprises a locking element 7a, whose distance from the insertion opening 5 corresponds at least to approximately the length of the shortest side edge K3 of the object 1. Thanks to the locking element 7a, the object 1 is locked in the storage position or its end position in the receiving space 4. The locking element 7a together with the front region of the wall 3a furthermore produces a further form fit for the holding of the object 1 in the receiving space 4.

Figure 6:
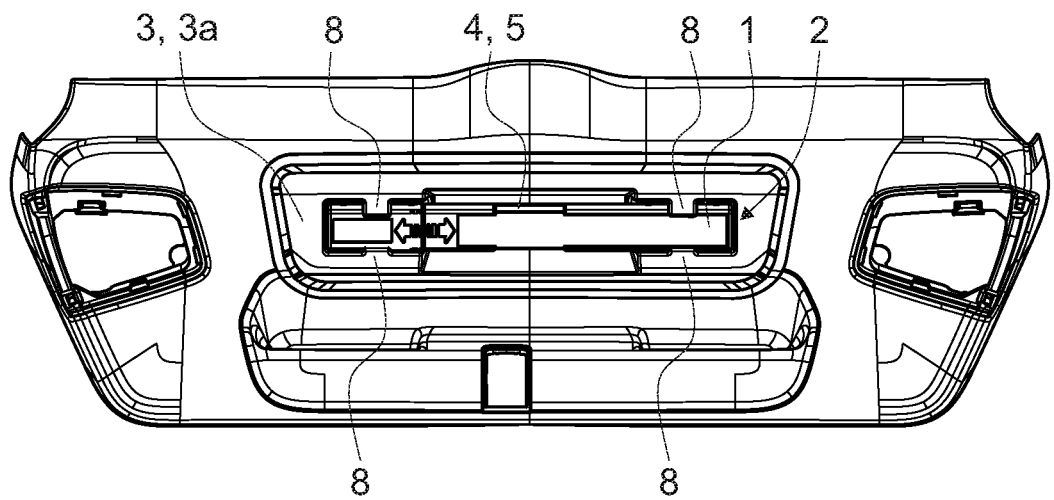
FIG. 6 a front view of another embodiment of the apparatus.
Figure 7:
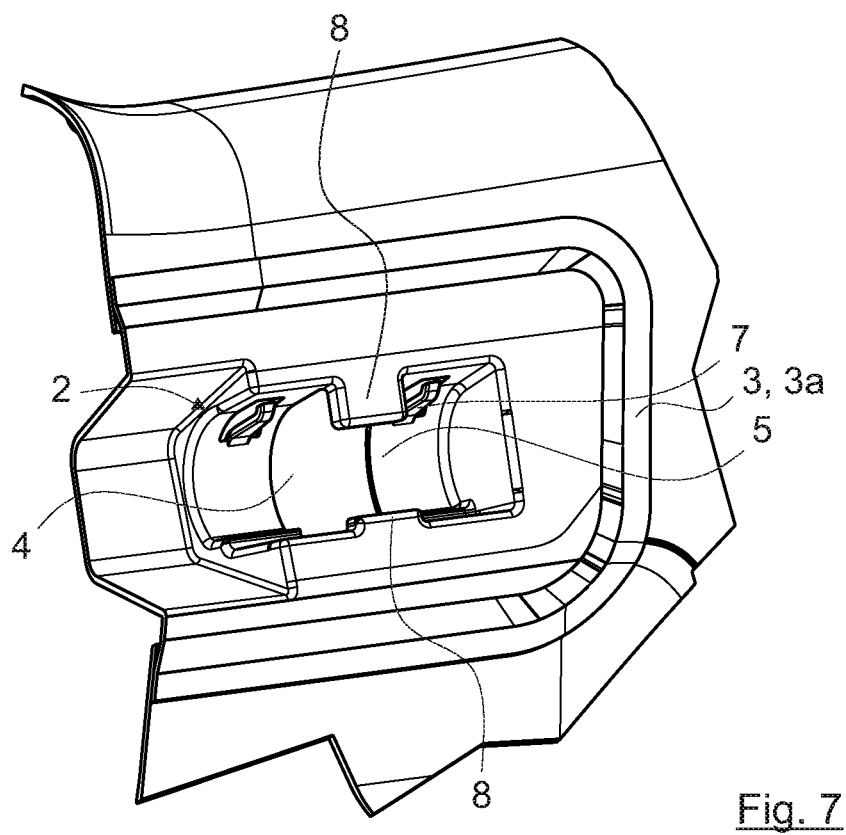
FIG. 7 an enlarged representation of the apparatus of FIG. 6.

FIGS. 6 and 7 show a very similar embodiment of the apparatus 2 in which protrusions 8 can be seen, being formed as a single piece with the lining 3 and extending into the insertion opening 5. These protrusions 8, which are also preferably present in the embodiment of FIGS. 2 to 4, reduce the width B of the insertion opening 5 so that the object 1 can only be introduced into and taken out from the insertion opening 5 by the shortest side edge K3, as described above, since the length of the side edge K2 with the medium length exceeds the width B of the insertion opening 5 in the region of the protrusions 8. Basically, the protrusions 8 could also extend over the entire length L of the insertion opening 5, but it is possible to economize on material in the manner shown. The protrusions 8 are preferably present on both sides of the insertion opening 5, but may also extend for different distances into the insertion opening 5 on the respective sides, as shown.

The invention claimed is:

1. An apparatus for receiving a cuboidal object, comprising: three side edges of different length, the three side edges comprising a longest side edge, a shortest side edge, and a side edge of the object having a medium length, in a motor vehicle, having a receiving space, which has an insertion opening, the length of which corresponds at least to the length of the longest side edge of the object and a width of which corresponds at least to the length of the shortest side edge of the object, but at least in sections is smaller than the length of the side edge of the object with the medium length, wherein the receiving space is of such a size that the object after being inserted through the insertion opening in the receiving space can be rotated through an angle of at least approximately 90° about its longitudinal axis and can be moved to a storage position in the receiving space.

2. The apparatus according to claim 1, wherein a depth of the receiving space corresponds at least to the length of the side edge of the object having the medium length, and a height of the receiving space corresponds at least to the length of the side edge of the object having the medium length.

3. The apparatus according to claim 1, wherein the object is held in the receiving space in a form fitting and force locking manner.

4. The apparatus according to claim 1, wherein the receiving space comprises a recess, an extension of which in the direction of a depth of the receiving space corresponds at least approximately to the length of the shortest side edge of the object.

5. The apparatus according to claim 1, wherein a spring element is provided in the receiving space.

6. The apparatus according to claim 5, wherein the spring element is formed as a single piece with a wall forming the receiving space.

7. The apparatus according to claim 5, wherein the spring element comprises a locking element, a distance of which from the insertion opening corresponds at least approximately to the length of the shortest side edge of the object.

8. The apparatus according to claim 1, further comprising protrusions extending into the insertion opening.

9. The apparatus according to claim 1, wherein the object is a packaging for a warning triangle.

10. The apparatus according to claim 1, wherein the receiving space is provided in a lining of a trunk hood of the motor vehicle.

11. The apparatus according to claim 2, wherein the object is held in the receiving space in a form fitting and force locking manner.

12. The apparatus according to claim 2, wherein the receiving space comprises a recess, an extension of which in the direction of the depth of the receiving space corresponds at least approximately to the length of the shortest side edge of the object.

13. The apparatus according to claim 3, wherein the receiving space comprises a recess, an extension of which in the direction of a depth of the receiving space corresponds at least approximately to the length of the shortest side edge of the object.

14. The apparatus according to claim 2, wherein a spring element is provided in the receiving space.

15. The apparatus according to claim 3, wherein a spring element is provided in the receiving space.

16. The apparatus according to claim 4, wherein a spring element is provided in the receiving space.

17. The apparatus according to claim 6, wherein the spring element comprises a locking element, a distance of which from the insertion opening corresponds at least approximately to the length of the shortest side edge of the object.

18. The apparatus according to claim 2, further comprising protrusions extending into the insertion opening.

19. The apparatus according to claim 3, further comprising protrusions extending into the insertion opening.

20. The apparatus according to claim 4, further comprising protrusions extending into the insertion opening.

* * * * *